2,996,493
POLYMERIZATION OF OLEFINS
Archibald P. Stuart, Media, Pa., assignor to Sun Oil Company, Philadelphia, Pa., a corporation of New Jersey
No Drawing. Filed May 22, 1958, Ser. No. 736,961
8 Claims. (Cl. 260—93.7)

This invention relates to the polymerization of olefins, and is more particularly directed to a process for the production of solid polymers of alpha-olefins, or solid copolymers of alpha-olefins, by contacting the olefinic material with a specific solid catalyst in the presence of a polymerization activator.

The preparation of solid polymers of olefins by use of a variety of catalysts, or polymerization initiators, has heretofore been described. For example, use of small amounts of oxygen, generally less than about 0.1%, at pressures of above about 1,000 atmospheres has been described as effective for obtaining solid polymers of ethylene. The use of solid catalysts, such as metal oxides, which are effective for preparing solid polymers of ethylene has also been described. In prior processes using solid catalysts, even small quantities of impurities must generally be excluded from the process. These prior processes have not proved entirely satisfactory. Difficulties include, for example, the necessity of using special, expensive catalysts in which the metal of a metal oxide must be converted to and maintained in a specific valence state; the necessity of using high pressure, which requires special and expensive equipment and operation procedures; and the necessity for removing all but trace quantities of impurities from the reactants and polymerization zone components, which requires special and expensive separation and purification procedures.

An object of the process of the invention is to provide a process for the preparation of solid polymers or copolymers of alpha-olefins. Another object is to provide a process for the polymerization of normally gaseous olefins. A specific object of the invention is to provide a process for the preparation of solid polymers of ethylene or propylene at relatively low temperatures and relatively low pressures using an inexpensive, easily prepared solid catalyst and a small quantity of a polymerization activator. A further object is to provide a process for the preparation of solid polymers of ethylene and propylene which does not require use of special separation means for preparing the components of the reaction mixture. Other objects and their achievement in accordance with the invention will be apparent hereinafter.

It has now been found that by simultaneously contacting, under polymerizing conditions, an alpha-olefin maintained in a liquid organic reaction medium with a dinickel phosphide and a polymerization activator, as hereinafter defined, the olefin is rapidly polymerized to solid polymers. For convenience, the following description of the process is largely directed to the polymerization of ethylene and the solid polymers obtained therefrom are designated as "polyethylene."

In accordance with an embodiment of the invention, a petroleum refinery stream consisting principally of ethylene is contacted, at a temperature of 85° C. and atmospheric pressure, with a reaction mixture consisting essentially of isooctane containing suspended particles of dinickel phosphide and a small, activating quantity of aluminum triethyl. The ethylene is rapidly polymerized to solid polymers which are recoverable from the reaction mixture. The process of the invention thus provides a low temperature, low pressure process for preparing solid polymers of normally gaseous olefins which uses an inexpensive catalyst and in which special purification means for the olefinic feed material are unnecessary.

The process of the invention is directed to the polymerization of alpha-olefins. By "alpha-olefins," as used herein, is meant olefins which have a terminal olefinic linkage, i.e., a terminal carbon atom is attached through an olefinic double bond to the adjacent carbon atom. It is preferred to use normally gaseous olefins in the process. Ethylene, propylene, isobutylene, and butene-1 and mixtures of these olefins are thus preferred feed stocks for the process. Other alpha-olefins such as 1,3-butadiene and the pentenes, hexenes, heptenes, and octenes having a terminal olefinic linkage, and mixtures thereof, can be used with good results. Such olefins, including the preferred normally gaseous olefins, or mixtures thereof, can be from any source such as from the thermal or catalytic cracking of higher boiling hydrocarbons, from the dehydrogenation of paraffins, from the dehydration of alcohol, or the like. Saturated paraffins, such as ethane, propane and butane can be present and act as diluents, and hence special separation means for the removal of saturated hydrocarbons is unnecessary. However, it is preferred to maintain the olefinic content of the feed material above about 70% by weight. Other polymerizable materials such as styrene, vinylcyclohexene, and the like, can be present to an extent of about 25% by weight, based on the alpha-olefin, and good results obtained. When present, such other polymerizable materials appear to copolymerize with the alpho-olefin to give valuable copolymers.

The nickel phosphide which can be used in the process of this invention is crystalline dinickel phosphide. A preferred method of preparing this crystalline dinickel phosphide is by the reduction of nickel orthophosphate in excess hydrogen, as described by Sweeny, Rohrer, and Brown in the Journal of the American Chemical Society, volume 80, pages 799–800, 1958. By this process, nickel hydroxide is reacted with hot, dilute phosphoric acid to form the nickel phosphate octahydrate, which is then dried to remove water of hydration. The remaining nickel orthophosphate is then heated with excess hydrogen to form the dinickel phosphide. This reaction is presumed to proceed as follows:

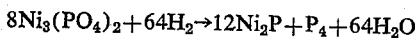

$$8Ni_3(PO_4)_2 + 64H_2 \rightarrow 12Ni_2P + P_4 + 64H_2O$$

The presence of a polymerization activator is essential to the process of the invention, since otherwise polymerization to any substantial extent is not observed. Materials which can be used as polymerization activators in the process of the invention are metal alkyls, metal hydrides, and alkyl metal halides, the metals being selected from groups II and III of the periodic table. Suitable metal alkyls include alkyl derivatives of aluminum, zinc, beryllium, magnesium and boron. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Metal hydrides which can be used as polymerization activators include, for example, diborane, aluminum hydride, and beryllium hydride. Alkyl metal halides which can be used include Grignard reagents such as methylmagnesium bromide, ethylmagnesium chloride, phenylmagnesium bromide, and the like, and other alkyl metal halides such as diethyl aluminum chloride, ethyl aluminum dichloride, and the like. The presence of a polymerization activator is essential to the process of the invention, as above stated, since otherwise polymerization to any substantial extent is not observed. However, only a small quantity of the activator is necessary, and a molar ratio of activator to dinickel phosphide catalyst of from 1:1,000 to 1:1 gives good results, but even higher ratios can be used, say up to about 10:1.

The process of the invention can be operated as slurry-type operation or as a continuous process. In slurry operation, particles of the dinickel phosphide are suspended in an inert, liquid organic reaction medium, and a quantity of a polymerization activator added thereto to form the catalytic system of the process of the invention. If desired, the polymerization activator can be added periodically in relatively small quantities to the reaction mixture. Ethylene in gas phase or dissolved in an inert organic material, which if used is preferably the same as the reaction medium, is contacted with the catalytic system. The temperature of the reaction mixture during the contacting is maintained in the range of from about 0° C. to 200° C., and preferably is within the range of from 50° C. to 150° C. The pressure to employ must be sufficient to maintain liquid phase operation. The pressure can vary from about atmospheric pressure to about 300 p.s.i.g. (pounds per square inch gauge) and good results obtained, but even higher pressure can be used if desired, although no advantage is obtained thereby. The rate of addition of ethylene to the reaction medium can be adjusted so that substantially all of the ethylene is converted to solid polymers. If desired, however, ethylene can be introduced at a faster rate and the excess ethylene recovered and recycled to the process.

When performing the process as a continuous operation, the dinickel phosphide catalyst, in the form of particles, is introduced into a reactor and ethylene dissolved in an inert organic reaction medium, to which is added a small quantity of a polymerization activator, is passed through the reactor in contact with the dinickel phosphide. In some instances the polymerization activator can be incorporated into the dinickel phosphide bed, such as where the activator is is substantially insoluble in the reaction medium. The temperature and pressure conditions are maintained within the range described for slurry operation. The space rate is advantageously maintained within the range of from 0.1 to 10 volumes of reaction mixture per volume of catalyst per hour (v./v./hr.).

The organic reaction medium to employ must be liquid and substantially inert under the conditions used. Saturated hydrocarbons, including paraffins such as the pentanes, hexanes, octanes, decanes, and mixtures thereof, and cycloparaffins, such as cyclopentane, alkyl substituted cyclopentanes, cyclohexane, alkyl substituted cylohexanes, decalin, mixtures thereof with each other and with paraffins give good results and are preferred. Aromatic hydrocarbons such as benzene, toluene, xylene, and the like can also be used with good results. Halogen substituted aromatics are also inert to the process and give good results. The quantity of organic reaction medium to employ can be varied widely and good results obtained. Generally, a quantity sufficient to form a light slurry of the solid catalyst particles is used, which amount is advantageously from about 5 to 1,000 parts or more, based on the weight of the solid catalyst phase, and when continuous operation is used, a quantity sufficient to dissolve from about 1% to 20% by weight of the olefin should be used.

The solid polymer products of the invention may be dissolved, suspended or both dissolved and suspended in the hydrocarbon reaction medium. Recovery of the solid polymers can be performed by any convenient means. Preferably the polymers are separated from the catalyst, such as by dissolving the polymers at an elevated temperature, in a solvent such as xylene, and cooling to a temperature of from about 10° C. to 25° C. to precipitate dissolved polymers. A washing step can advantageously be employed, and such step can be performed to deactivate the polymerization activator. The solid polymers can then be recovered by filtration and dried or otherwise further treated as desired.

Polymers prepared by the process of this invention vary from soft, wax-like polymers having molecular weights of 300 to 800, to hard polymers having molecular weights of 150,000 or more. The low molecular weight material may be separated from the polymer product by dissolving it in a hot solvent such as n-heptane or isooctane. The high molecular weight material remaining is a hard, predominantly crystalline material, having a high melting point. Polyethylene, for example, prepared by this process has a melting point of 130° C. to 140° C., and polypropylene has a melting point of 160° C. to 170° C. The products are useful as thin films for wrapping food products and the like, as pipes for transporting fluids, as containers for corrosive fluids, and the like. Such articles can be made by molding, extrusion or other fabrication processes.

The following example illustrates an embodiment of the invention in which "parts" refers to parts by weight:

Three parts of nickel hydroxide are stirred into boiling distilled water having dissolved therein two parts of phosphoric acid. The nickel phosphate octahydrate formed is filtered, washed and dried in air of several days, then dried at 145° C. for 24 hours. One part of the nickel phosphate powder obtained is contacted with excess hydrogen at about 550° for about 15 hours, whereby crystalline dinickel phosphide is prepared.

In the substantial absence of air and water, about 0.4 part of dinickel phosphide particles slurried in isooctane are introduced to a reactor fitted with a stirrer. Ethylene and additional isooctane are injected into a reactor, until it contains about 100 parts of isooctane containing about 55 mole percent of ethylene at 100 p.s.i.g. pressure. The reaction mixture is then heated to about 70° C. and the pressure adjusted to 200 p.s.i.g. Sufficient aluminum triethyl is then introduced into the reaction mixture to make a mole ratio of aluminum triethyl to dinickel phosphide of about 1:2, whereupon polymerization starts immediately. Additional ethylene is injected from time to time in order to maintain the pressure in the reactor. After about one hour, the reaction is stopped, and about 50 parts of methanol are added to the reaction mixture. The solids are then filtered from the mixture, heated with xylene, and then cooled to 20° C. to precipitate the polymer. Solid, high molecular weight polyethylene is recovered.

Substantially equivalent results are obtained when other activators are used with the dinickel phosphide catalyst. Adjustment of the reaction conditions, within the limits defined herein, is necessary to obtain optimum results with a given system. Other olefins, as defined herein, give similar solid polymer products when used in the process, and good results are obtained therewith.

The invention claimed is:

1. A process for the preparation of solid polymers of normally gaseous olefins which comprises simultaneously contacting a normally gaseous olefin maintained in an inert liquid organic reaction medium, at a temperature of from about 0° C. to about 200° C., with crystalline dinickel phosphide and a polymerization activator selected from the group consisting of the metal alkyls, metal hydrides and alkyl metal halides of the metals of groups II and III of the periodic table, and recovering a solid polymer of the olefin.

2. A process as defined by claim 1 wherein the olefin is propylene.

3. A process as defined by claim 1 wherein the olefin is ethylene.

4. A process as defined by claim 1 wherein the olefin is butene-1.

5. A process as defined by claim 1 wherein the olefin is 1,3-butadiene.

6. A process as defined by claim 1 wherein the polymerization activator selected is aluminum triethyl.

7. A process as defined in claim 1 wherein the polymerization activator selected is diethyl aluminum chloride.

8. A process as defined by claim 1 wherein the polymerization activator selected is aluminum triisobutyl.

References Cited in the file of this patent

UNITED STATES PATENTS

| | | |
|---|---|---|
| 2,762,791 | Pease et al. | Sept. 11, 1956 |
| 2,781,410 | Ziegler et al. | Feb. 12, 1957 |
| 2,871,276 | Eiszner | Jan. 27, 1959 |
| 2,905,659 | Miller | Sept. 22, 1959 |

FOREIGN PATENTS

| | | |
|---|---|---|
| 534,792 | Belgium | May 1, 1955 |
| 779,111 | Great Britain | July 17, 1957 |